(12) United States Patent
Kwon et al.

(10) Patent No.: US 12,512,163 B2
(45) Date of Patent: Dec. 30, 2025

(54) MEMORY DEVICE AND OPERATING METHOD OF MEMORY DEVICE

(71) Applicant: SK hynix Inc., Icheon-si (KR)

(72) Inventors: Chan Keun Kwon, Icheon-si (KR); Jaehyeong Hong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 38 days.

(21) Appl. No.: 18/425,195

(22) Filed: Jan. 29, 2024

(65) Prior Publication Data

US 2025/0054551 A1 Feb. 13, 2025

(30) Foreign Application Priority Data

Aug. 9, 2023 (KR) .......................... 10-2023-0104014

(51) Int. Cl.
*G11C 8/18* (2006.01)
*G11C 7/22* (2006.01)
*G11C 16/04* (2006.01)
*G11C 16/26* (2006.01)
*G11C 16/32* (2006.01)

(52) U.S. Cl.
CPC .......... *G11C 16/26* (2013.01); *G11C 16/0483* (2013.01); *G11C 16/32* (2013.01)

(58) Field of Classification Search
CPC ..... G11C 16/26; G11C 16/0483; G11C 16/32; G11C 7/106; G11C 7/1057; G11C 7/222; G11C 7/1051; G11C 7/22; G06F 3/061; G06F 3/0679
See application file for complete search history.

(56) References Cited

U.S. PATENT DOCUMENTS

| | | | | |
|---|---|---|---|---|
| 2006/0090108 A1* | 4/2006 | Seyyedy | ................ | G11C 29/40 |
| | | | | 714/718 |
| 2013/0315007 A1* | 11/2013 | Cha | ........................ | G11C 29/40 |
| | | | | 365/189.07 |
| 2014/0133235 A1* | 5/2014 | Kim | ........................ | G11C 8/08 |
| | | | | 365/185.12 |
| 2016/0191066 A1 | 6/2016 | Potty et al. | | |
| 2021/0117335 A1* | 4/2021 | Kondo | ............... | G11C 16/0483 |
| 2021/0141747 A1* | 5/2021 | Jeong | ..................... | G11C 7/222 |
| 2023/0170003 A1* | 6/2023 | Lim | ..................... | G11C 7/1036 |
| | | | | 365/189.011 |
| 2024/0249788 A1* | 7/2024 | Bak | .................. | G11C 29/50008 |
| 2024/0302978 A1* | 9/2024 | Park | ..................... | G06F 3/0673 |

FOREIGN PATENT DOCUMENTS

| KR | 101369277 B1 | 3/2014 |
|---|---|---|
| KR | 1020190085457 A | 7/2019 |
| KR | 1020210069514 A | 6/2021 |
| KR | 1020220018756 A | 2/2022 |

\* cited by examiner

*Primary Examiner* — Hien N Nguyen
(74) *Attorney, Agent, or Firm* — WILLIAM PARK AND ASSOCIATES LTD.

(57) ABSTRACT

A memory device may include memory banks comprised of memory blocks; data compressing circuits connected to memory blocks and first merge circuits. A second merge circuit receives output from the first merge circuits. A delay detecting circuit generates delay control signals by comparing the output control signals. A compensating circuit calibrates the output control signals, based on the delay control signal. An output buffer circuit latches the second merged data and outputs the second merged data, based on at least a portion of the output control signals.

18 Claims, 16 Drawing Sheets

MEMORY DEVICE AND OPERATING METHOD OF MEMORY DEVICE

CROSS-REFERENCE TO RELATED APPLICATION

The present application claims priority under 35 U.S.C. § 119(a) to Korean patent application number 10-2023-0104014 filed on Aug. 9, 2023, in the Korean Intellectual Property Office, the entire disclosure of which is incorporated by reference herein.

BACKGROUND

1. Technical Field

The present disclosure generally relates to a memory device and an operating method of a memory device.

2. Related Art

Data read from a memory device may be transferred to an input/output pad through a data line. The number of data lines in a memory device may be limited by physical limitations of the memory device. In general, a plurality of memory areas (memory banks) included within a plurality of memory devices, or within a single memory device may share and use the same fixed number of data lines.

In general, sharing data lines may require an operation in which a plurality of memory areas included in a plurality of memory devices or one memory device exclusively uses a fixed number of data lines in a set order within or during a set time period using time division.

However, in a specific operation mode, such as a compression read operation, data read from each memory area of a plurality of memory areas included in a plurality of memory devices or within one memory device may be compressed and output. Each memory area of the plurality of memory areas included in the plurality of memory devices or the one memory device may use a certain number of data lines, determined by assigning or allocating a fixed number of data lines for each memory area of the plurality of memory areas. Accordingly, the plurality of memory areas included in the plurality of memory devices or the one memory device may be used simultaneously.

For example, when data read in each of four memory devices is compressed by a factor of four or ¼ and the compressed data is then output, each memory device of the four memory devices uses only two data lines, the two data lines being determined or assigned by dividing eight data lines between each of the four memory devices. The four memory devices may be used simultaneously.

SUMMARY

Embodiments provide a memory device and an operating method of a memory device, which can reduce or prevent a merge failure which may occur in a merge process of data when a compression read operation is performed.

In accordance with an aspect of the present disclosure, there is provided a memory device including: a plurality of memory banks each memory bank including a plurality of memory blocks; a plurality of compressing circuits, each compressing circuit connected to at least one memory bank. Each compressing circuit outputs compressed data by compressing data obtained from a memory bank. First merge circuits to receive output control signals from the memory banks and provide streams of first merged data by merging compressed data output from at least two different compressing circuits into a single, compressed data stream responsive to output control signals. A second merge circuit receives at least two first merged data streams output from different first merge circuits. The second merge circuit outputs a second merged data stream by merging the at least two first merged data streams. A delay detecting circuit receives the output control signals and generates delay control signals by comparing the output control signals. A compensating circuit calibrates the output control signals, based on the delay control signal; and an output buffer circuit configured to latch the second merged data, and output the second merged data, based on at least a portion of the output control signals.

In accordance with another aspect of the present disclosure, there is provided a method of operating a memory device, the method including: generating delay control signals, based on output control signals output from at least a portion of a plurality of memory banks; calibrating the output control signals, based on the delay control signals; compressing data read from the plurality of memory banks; performing first merging on compressed data corresponding to different memory banks in a plurality of first merge circuits, based on the calibrated output control signals; performing second merging on first merged data on which the first merging is performed in a second merge circuit; and outputting second merged data on which the first merging is performed, based on the calibrated output control signals.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
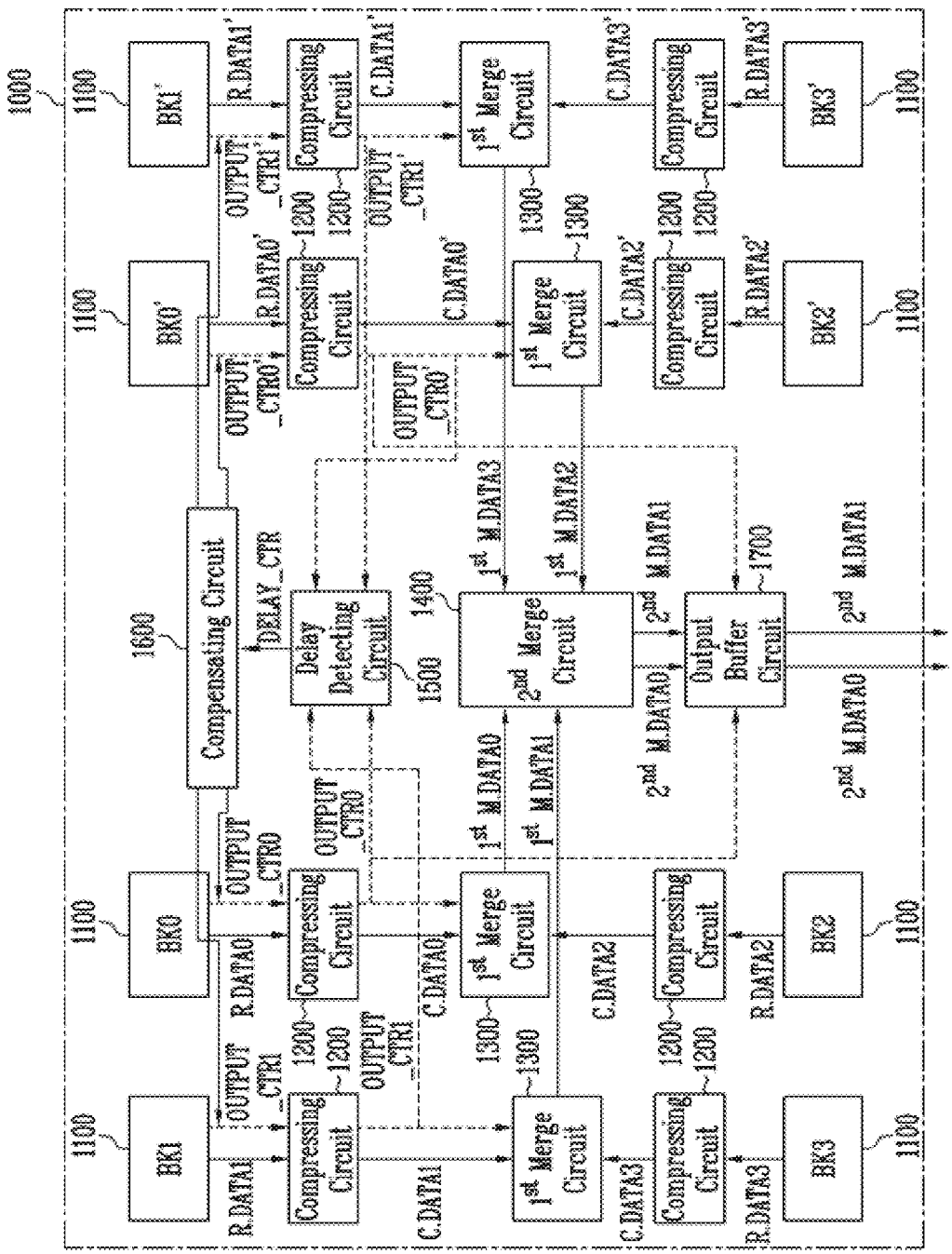
FIG. 1 is a block diagram illustrating a memory device in accordance with an embodiment of the present disclosure.

FIG. 1 is a block diagram illustrating a memory device in accordance with an embodiment of the present disclosure.

Referring to FIG. 1, a memory device 1000 may include a plurality of memory banks, each of which is identified in FIG. 1 by reference numeral 1100. Each memory bank 1100 may include a plurality of memory blocks, not shown. Each memory block may include a plurality of memory cells, not shown.

In an embodiment, the memory cells may be nonvolatile memory cells. Memory cells connected to the same word line (not shown) may be defined as a page. Therefore, one memory block BK may include a plurality of pages.

In an embodiment, the memory banks 1100 may be memory areas included in different memory devices, respectively. In another embodiment, the memory banks 1100 may be different memory areas divided in one memory device.

In FIG. 1, 8 memory banks 1100 BK0 to BK3 and BK0' to BK3' are included in the memory device 1000. However, the number of memory banks 1100 is not limited thereto and is a design choice. The number of memory banks 1100 may thus be less than or greater than the 8 memory banks shown in FIG. 1. In another example, the number of memory banks 1100 may be 16 or 32.

In an embodiment, the memory banks 1100 may be divided into one or more memory planes, and one or more memory banks 1100 may be included in one memory plane. For example, bank 0 to bank 3 BK0 to BK3 may be included in a first memory plane, and bank 0' to bank 3'BK0' to BK3' may be included in a second memory plane. Alternatively, the bank 0 and the bank 1 BK0 and BK1 may be included in a first memory plane, the bank 2 and the bank 3 BK2 and BK3 may be included in a second memory plane, the bank 0' and the bank 1' BK0' and BK1' may be included in a third memory plane, and the bank 2' and the bank 3' BK2' and BK3' may be included in a fourth memory plane. The number of memory planes and the number of banks included in the memory planes is a design choice and not limited to specific numbers thereof.

A compressing circuit 1200 may be connected to each memory bank 1100. The compressing circuit 1200 may be enabled when the memory device 1000 performs a "compression read" operation, which may occur in response to a command received by the memory device 1000 from a device that is outside or external to the memory device 1000, which is not shown in FIG. 1. In another embodiment, the memory device 1000 may perform the compression read operation, autonomously, i.e., determined by its own control logic.

When the compression read operation is performed, in a first step, read data R.DATA may be output from each memory bank 1100. The read data R.DATA may be output from each memory bank 1100 in response to an output control signal OUTPUT_CTR. The output control signal OUTPUT_CTR may be generated in response to a clock signal provided from the outside the memory device 1000 or it may be provided from a clock signal source in the memory device 1000. Although only control signals OUTPUT_CTR0, OUTPUT_CTR1, OUTPUT_CTR0', and OUTPUT_CTR1' output from the bank BK0, the bank 1 BK1, the bank 0' BK0', and the bank 1' BK1' are illustrated in FIG. 1, the present disclosure is not limited thereto. Other memory banks 1100 not shown may output corresponding, other control signals OUTPUT_CTR, respectively.

After the compression read operation, the read data R.DATA read from each memory bank 1100 may be compressed in a compressing circuit 1200 connected to each memory bank 1100. After compression by the compressing circuit 1200 compressed data C.DATA may be output from the compressing circuit 1200 in response to the output control signal OUTPUT_CTR.

The compressing circuit 1200 may compress the read data R.DATA at a compression ratio or compression factor of 1:N, thereby generating correspondingly compressed data C.DATA. N may be a whole number greater than or equal to two (2). For example, when N is 4, the compressing circuit 1200 may compress the read data R.DATA at a compression ratio of 1:4, i.e., reducing the "amount" or "size" of the data before compression by a factor of 4. The size of the compressed data is thus 25%, the size of the same data before compression, thereby generating the compressed data C.DATA. For example, if read data R.DATA before compression is 16 bits, 4-bits of compressed data C.DATA may be output from the compressing circuit 1200.

Compressed data C.DATA output from multiple different a compressing circuits 1200 may be merged in a first merge circuit 1300. The first merge circuit 1300 may merge compressed data C.DATA corresponding to different memory banks 1100. For example, as shown in FIG. 1, C.DATA0 compressed data from bank BK0 and C.DATA2 as compressed data from bank 2 BK2 may be merged in a first merge circuit 1300 that receives C.DATA0 and C.DATA2. The number and positions or locations of memory banks 1100 that may generate compressed data C.DATA that is merged in the first merge circuit 1300 are design choices.

Each first merge circuit 1300 may receive compressed data C.DATA from 2 or more compressing circuits 1200 and an output control signal OUTPUT_CTR, which corresponds to compressed data C.DATA from the corresponding different memory banks 1100.

In an embodiment, the first merge circuit 1300 may latch the compressed data C.DATA corresponding to different memory banks 1100 and output the latched compressed data C.DATA in response to the output control signal OUTPUT_CTR. Compressed data C.DATA corresponding to the different memory banks 1100 may then be output from the first merge circuit 1300 as first merged data $1^{st}$ M.DATA.

A first merge circuit 1300 may select and use any one of the output control signals OUTPUT_CTR that a first merge circuit 1300 receives from a memory bank 1100 that might be coupled to the first merge circuit 1300, each received OUTPUT_CTR signal corresponding to respective compressed data C.DATA. For example, when C.DATA0 and C.DATA2 are merged by a first merge circuit 1300, that first merge circuit 1300 may select and generate an output control signal OUTPUT_CTR0 that is output from the bank 0 BK0 and may select and generate a second output control signal 2 (not shown), which is output from the bank 2 BK2. Accordingly, first merged data $1^{st}$ M.DATA0 may be output in response to the output control signal OUTPUT_CTR0. The method of selecting the output control signal OUTPUT_CTR is not limited to a specific example.

First merged data $1^{st}$ M.DATA0 output from the first merge circuit 1300 may be coupled to and merged in a second merge circuit 1400. The second merge circuit 1400 may merge first merged data $1^{st}$ M.DATA1, $1^{st}$ M.DATA2, $1^{st}$ M.DATA3 that are output from different first merge circuits 1300.

For example, first merged data $1^{st}$ M.DATA0 and first merged data 1 $1^{st}$ M.DATA1 may be merged in the second merge circuit 1400. In another example, the first merged data $1^{st}$ M.DATA0 and first merged data $1^{st}$ M.DATA3 may be merged in the second merge circuit 1400. The number and positions of first merge circuits 1300 corresponding to first merged data merged in the second merge circuit 1400 are a design choice and are not limited to the specific examples described herein.

The second merge circuit 1400 may thus merge the first merged data $1^{st}$ M.DATAn with a different first merged data $1^{st}$ M.DATAm and output second merged data $2^{nd}$ M.DATAn+m. The output second merged data $2^{nd}$ M.DATAn+m may be latched in an output buffer circuit 1700. The second merged data $2^{nd}$ M.DATAn+m latched in the output buffer circuit 1700 may be output from the buffer circuit 1700 by or in response to on an output control signal OUTPUT_CTR, as shown in FIG. 1. The output buffer circuit 1700 may select any one of the output control signals OUTPUT_CTR corresponding to second merged data $2^{nd}$ M.DATA to be output, and thereby output the second merged data $2^{nd}$ M.DATA in response to the selected output control signal OUTPUT_CTR.

For example, when second merged data $2^{nd}$ M.DATA0 is obtained by merging first merged data $1^{st}$ M.DATA0 and first merged data $1^{st}$ M.DATA1, the output buffer circuit 1700 may select and use the output control signal OUTPUT_CTR0 from the output control signal OUTPUT_CTR0 and output control signal OUTPUT_CTR1. Accordingly, the second merged data $2^{nd}$ M.DATA0 may be output from the output buffer circuit 1700 in response to the output control signal OUTPUT_CTR0.

As shown in FIG. 1, output control signals OUTPUT_CTRn may be provided to a delay detecting circuit 1500, which may generate delay control signals DELAY_CTR by comparing received output control signals OUTPUT_CTRn. In an embodiment, the delay detecting circuit 1500 may compare output control signals OUTPUT_CTR corresponding to the data signals that comprise the first merged data $1^{st}$ M.DATA and which are to be merged in the second merge circuit 1400.

For example, when in the second merge circuit 1400, the first merged data $1^{st}$ M.DATA0 and the first merged data $1^{st}$ M.DATA1 are merged and first merged data $1^{st}$ M.DATA2 and first merged data $1^{st}$ M.DATA3 are merged, the delay detecting circuit 1500 may compare the output control signal OUTPUT_CTR0 and the output control signal OUTPUT_CTR1 with each other and compare an output control signal OUTPUT_CTR2 and an output control signal OUTPUT_CTR3 with each other. The delay detecting circuit 1500 may then compare a phase difference, i.e., a delay difference between the compared output control signals OUTPUT_CTR. As a result of that comparison, the delay detecting circuit 1500 may generate a delay control signal DELAY_CTR, which indicates whether the delay difference between the output control signals OUTPUT_CTR is in or out of a predetermined delay range. In an embodiment, the delay control signal DELAY_CTR may indicate whether it is necessary to delay each of the output control signals OUTPUT_CTR. Also, in an embodiment, the delay control signal DELAY_CTR may include information on how much each of the output control signals OUTPUT_CTR is to be delayed.

The delay control signal DELAY_CTR generated in the delay detecting circuit 1500 may be provided to a compensating circuit 1600, which may calibrate the output control signals OUTPUT_CTR, based on the received delay control signal DELAY_CTR. In an embodiment, the compensating circuit 1600 may or may not delay the output control signals OUTPUT_CTR according to the delay control signal DELAY_CTR.

The delay-calibrated output control signals OUTPUT_CTR may be used for outputting and merging of data in a subsequent operation. For example, as the calibrated output control signal OUTPUT_CTR is provided to the first merge circuit 1300, the calibrated output control signal OUTPUT_CTR may be used when the first merged data $1^{st}$ M.DATA is generated by the first merge circuit 1300. In addition, as the calibrated output control signal OUTPUT_CTR is provided to the second merge circuit 1400 or the output buffer circuit 1700, the calibrated output control signal OUTPUT_CTR may be used when the second merged data $2^{nd}$ M.DATA is generated and output.

As such, a difference in the delay between control signals OUTPUT_CTR used for outputting and merging of data is reduced through calibration or synchronization of the output control signals OUTPUT_CTR to each other so that the incidence of a data merge failure, which may occur due to the delay difference between output control signals OUTPUT_CTR, can be reduced or prevented.

Figure 2:
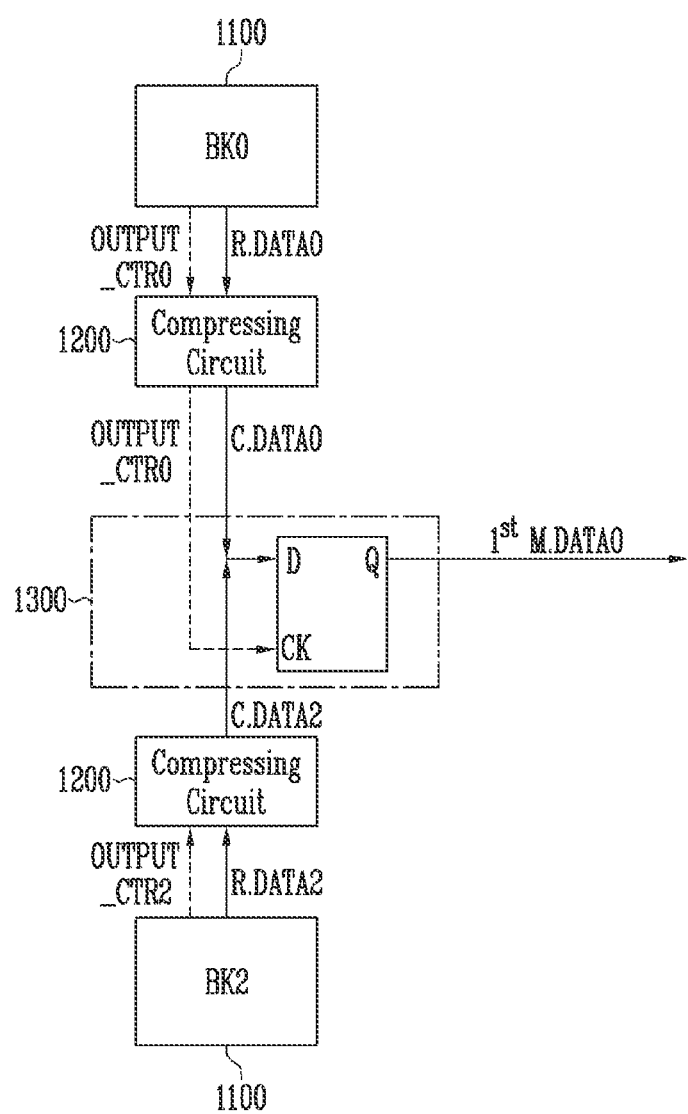
FIG. 2 is a diagram illustrating a first merge circuit shown in FIG. 1.

FIG. 2 is a block diagram illustrating a first merge circuit 1100 shown in FIG. 1.

Referring to FIG. 2, read data R.DATA0 read from the memory bank BK0 may be compressed by a "first" compressing circuit 1200, as shown in the upper half of FIG. 2. The compressed form of the read data R.DATA0, which is denominated asC.DATA0, may be output from the "first" compressing circuit 1200.

As shown in the lower half of FIG. 2, read data R.DATA2 read from a different memory bank BK2, may be compressed by a different or "second" compressing circuit 1200. The compressed form of that other data from a different memory bank BK2 denominated as C.DATA2, may be output from the other compressing circuit 1200.

As shown in FIG. 2, a corresponding output control signal OUTPUT_CTR0 and OUTPUT_CTR2, may be output from memory bank BK0 and BK2. from each memory bank 1100, (BK0 and BK2). The read data R.DATA may thus be output from each of memory bank 1100 (BK0 and BK2) In response to the output control signals OUTPUT_CTR0 and OUTPUT_CTR2. Therefore, the read data R.DATA0 may be output in response to output control signal OUTPUT_CTR0.

The read data R.DATA2 may be output in response to output control signal OUTPUT_CTR2.

The compressed data C.DATA0 and the compressed data C.DATA2 may be merged by a first merge circuit 1300. In an embodiment and as shown in FIG. 2, the first merge circuit 1300 may comprise a D flip-flop. Compressed data C.DATA0 and Compressed data C.DATA2 are "tied" together such that both of them are input to the same D input terminal of a D flip-flop to be latched. In an alternate embodiment, the first merge circuit 1300 may include several D flip-flops, the number of which corresponds to the number of data bits read from the memory bank 1100. For example, if 16-bit data is read from the memory bank 1100, the first merge circuit 1300 may include 16 flip-flops. In a normal read operation, 16-bit data may be read from the memory bank 1100 with each bit of the data read from the memory bank 1100 being latched into one of the 16 D flop-flops.

In the compression read operation, when read data R.DATA is compressed at a compression ratio of 1:2, i.e., 50% by the compressing circuit 1200, 8-bit compressed data C.DATA0 output from the memory bank BK0 and the 8-bit compressed data C.DATA2 output from memory bank BK2 may be latched into 16 flip-flops. When read data R.DATA is compressed at a compression ratio of 1:4, i.e., 25% by the compressing circuit 1200, the 4-bit compressed data C.DATA0 output from bank BK0 and the 4-bit compressed data C.DATA2 output from bank BK2 may be latched into 8 of the 16 flip-flops with the other 8 flip-flops not used.

The latched compressed data C.DATA0 and the latched compressed data C.DATA1 may be temporally aligned, i.e., simultaneously latched into and output from the D flip-flop by an output control signal OUTPUT_CTR provided to the clock input terminal CK so that a first merged data 1, M.DATA0 is output from the D flip flop at the Q output terminal.

In FIG. 2, the output control signal OUTPUT_CTR0 is used as the clock signal, which causes the data at the D input terminal (whether it is a logic zero or logic one) into the D flip flop and thus output from the Q output terminal of the flip flop. However, the present disclosure is not limited thereto, and the clock signal input to the D flip-flop may be alternately be the output control signal OUTPUT_CTR2. Accordingly, in an alternate embodiment, a first merge circuit 1300 may include a clock signal selector circuit, which may be embodied as a multiplexer for instance in order to select which clock signal of several clock signals are to be provided to the clock input terminal of the D flip-flop.

Figure 3:
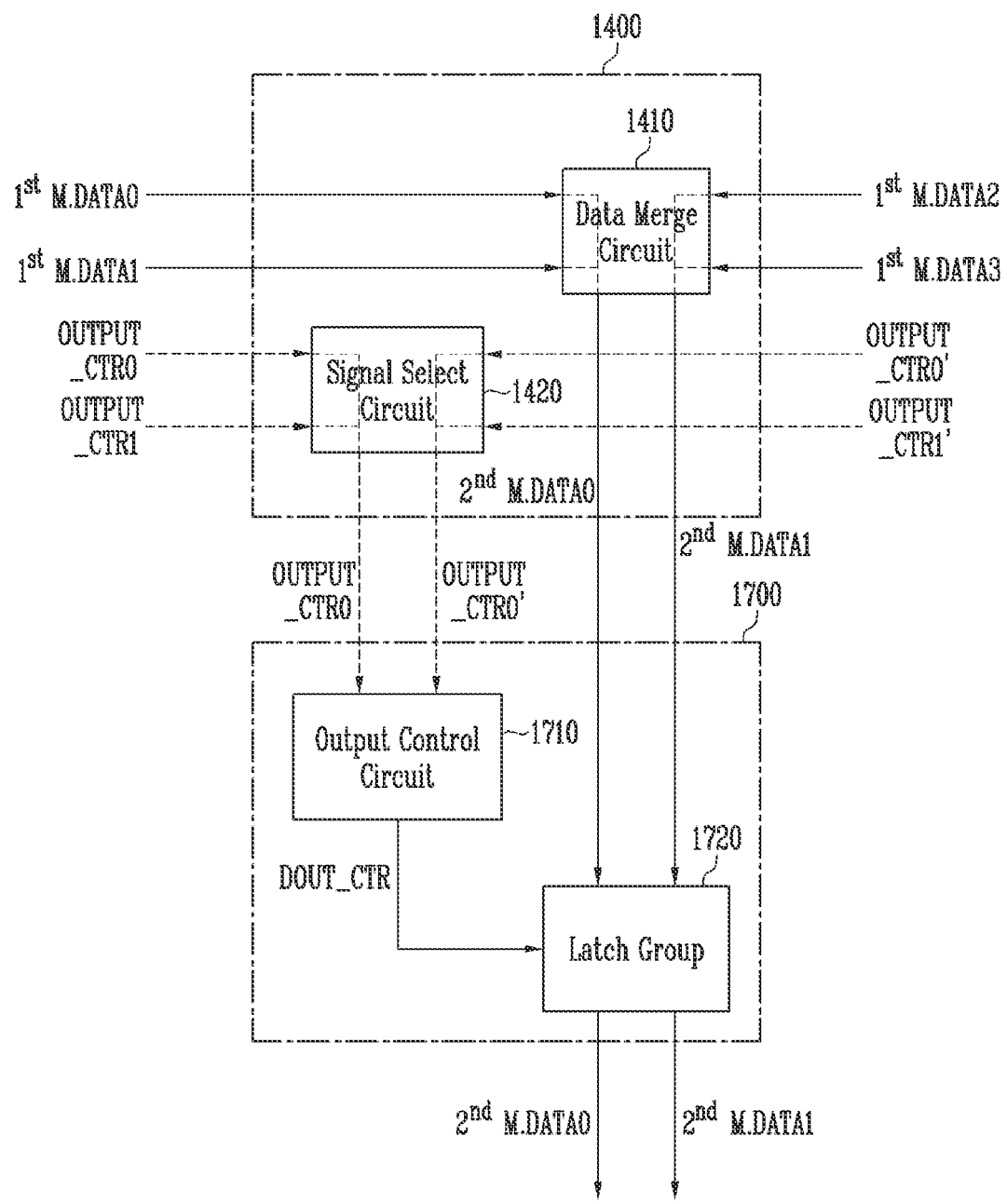
FIG. 3 is a diagram illustrating a second merge circuit and an output buffer circuit, which are shown in FIG. 1.

FIG. 3 is a block diagram illustrating the second merge circuit 1400 and an output buffer circuit 1700 shown in FIG. 1.

Referring to FIG. 3, the second merge circuit 1400 may include a data merge circuit identified by reference numeral 1410. The second merge circuit 1400 may also include a signal select circuit 1420.

The data merge circuit 1410 may receive and merge first merged data $1^{st}$ M.DATA output from a plurality of first merge circuits 1300. For example, the data merge circuit 1410 may merge a first merged data denominated as $1^{st}$ M.DATA0 with a "second" or "different" first merged data denominated as $1^{st}$ M.DATA1 and thereafter output a second merged data denominated as $2^{nd}$ M.DATA0.

The same data merge circuit 1410 may merge another first merged data denominated as $1^{st}$ M.DATA2 with yet another first merged data denominated as $1^{st}$ M.DATA3 and output a another and different "second" merged data denominated as $2^{nd}$ M.DATA1. However, the number and positions of first merge circuits 1300 corresponding to first merged data merged by the data merge circuit 1410 are not limited to a specific example.

In an embodiment, the data merge circuit 1410 may include one or more multiplexers. All of the first merged data $1^{st}$ M.DATA streams provided or input to the data merge circuit 1410 may thus be merged together and output to the latch group 1720, as shown in FIG. 3.

The signal select circuit 1420 may receive output control signals OUTPUT_CTR from memory banks 1100. When a memory device 1000 performs a compression read operation, the signal select circuit 1420 may select and output at least a portion of the received output control signals OUTPUT_CTR.

In an embodiment, the signal select circuit 1420 may select one of the output control signals OUTPUT_CTR corresponding to the first merged data $1^{st}$ M.DATA merged by the data merge circuit 1410. As shown in FIG. 3, when the data merge circuit 1410 merges first merged data $1^{st}$ M.DATA0 and first merged data $1^{st}$ M.DATA1 together and outputs the second merged data $2^{nd}$ M.DATA0, and when the data merge circuit 1420 merges first merged data $1^{st}$ M.DATA2 and first merged data $1^{st}$ M.DATA3 together and outputs the second merged data $2^{nd}$ M.DATA1, the signal select circuit 1420 may select and output control signal OUTPUT_CTR0 and output control signal OUTPUT_CTR1 and select and output output control signal OUTPUT_CTR0' and output control signal OUTPUT_CTR1'. For example, in FIG. 3, the output control signal OUTPUT_CTR0 is selected from the output control signal OUTPUT_CTR0 and the output control signal OUTPUT_CTR1, and the output control signal OUTPUT_CTR0' is selected from the output control signal OUTPUT_CTR0' and the output control signal OUTPUT_CTR1'.

When the memory device 1000 performs the normal read operation, the signal select circuit 1420 does not simultaneously receive the output control signal OUTPUT_CTR0 and the output control signal OUTPUT_CTR1 or the output control signal OUTPUT_CTR0' and the output control signal OUTPUT_CTR1'. Hence, the signal select circuit 1420 may output a receive output control signal OUTPUT_CTR as it is.

The second merged data $2^{nd}$ M.DATA merged and output by the data merge circuit 1410 and the output control signal OUTPUT_CTR selected by the signal select circuit 1420 may be provided to the output buffer circuit 1700. The output buffer circuit 1700 may include an output control circuit 1710 and a latch group 1720.

The latch group 1720 may include a plurality of latches, and the second merged data $2^{nd}$ M.DATA output from the second merge circuit 1400 may be latched to the plurality of latches. The output control circuit 1710 may provide a data-out control signal DOUT_CTR to the latch group 1720, based on the output control signals OUTPUT_CTR received from the second merge circuit 1400. The second merged data $2^{nd}$ M.DATA latched to the latch group 1720 may be output in response to the data-out control signal DOUT_CTR.

Figure 4:
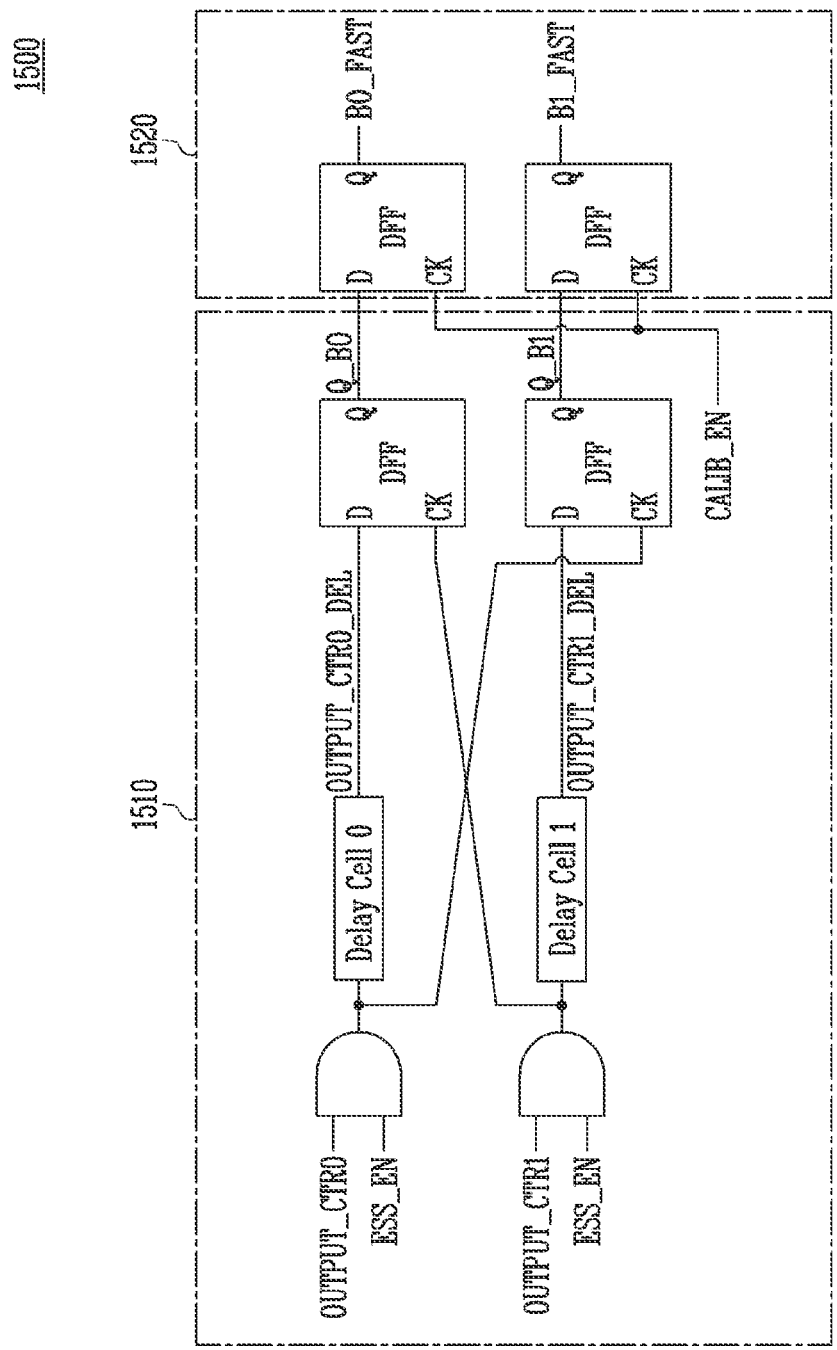
FIG. 4 is a diagram illustrating a delay detecting circuit shown in FIG. 1.

FIG. 4 is a diagram illustrating the delay detecting circuit shown in FIG. 1.

Referring to FIG. 4, the delay detecting circuit 1500 may include a delay control signal generator 1510 and a delay control signal output unit 1520.

The delay control signal generator 1510 may receive and compare output control signals OUTPUT_CTR0 and OUTPUT_CTR1. In an embodiment, the delay detecting circuit 1500 may compare output control signals corresponding to first merged data $1^{st}$ M.DATA merged by the second merge circuit 1400. For example, first merged data 1$^{st}$ M.DATA0 and first merged data 1$^{st}$ M.DATA1 may be merged by the second merge circuit 1400. The delay detecting circuit 1500 may receive and compare output control signal OUTPUT_CTR0 and output control signal OUTPUT_CTR1, which respectively correspond to the first merged data 1$^{st}$ M.DATA0 and the first merged data 1$^{st}$ M.DATA1.

And, the delay detecting circuit 1500 may be enabled when the compression read operation is performed. In an embodiment, the delay control signal generator 1510 may receive a compression read enable signal ESS_EN.

In an embodiment, the delay control signal generator 1510 may include two D flip-flops, DFF. The D flip-flops DFF of the delay control signal generator 1510 may compare a delay difference between the output control signals OUTPUT_CTR0 and OUTPUT_CTR1, and generate a delay control signal indicating whether the delay difference between them is out of a predetermined range.

In an embodiment, the delay control signal generator 1510 may include a delay circuit Delay Cell 1. Accordingly, the output control signal OUTPUT_CTR1 may be delayed by the predetermined range. For example, in FIG. 4, the delay circuit Delay Cell 1 may delay output control signal OUTPUT_CTR1 and provide the delayed output control signal as an input to the D input terminal of lower D flip-flop DFF depicted in FIG. 4.

A delayed output control signal OUTPUT_CTR1_DEL may be input to a D input of the lower D flip-flop in the delay control signal generator 1510. As shown in FIG. 4, the output control signal OUTPUT_CTR1 may be input to the clock input terminal of the upper D flip-flop in the delay control signal generator 1510. Accordingly, a signal indicating whether a delay difference between output control signals is out of the predetermined range may be output from a D flip-flop in the delay control signal generator 1510. More specifically, when comparing the output control signal OUTPUT_CTR0 with the output control signal OUTPUT_CTR1, a signal Q_B0 indicating whether the output control signal OUTPUT_CTR0 is faster than the predetermined range may be output.

Identically, a delayed output control signal OUTPUT_CTR1_DEL may be input to a data input terminal of another D flip-flop in the delay control signal generator 1510, and the output control signal OUTPUT_CTR0 may be input to a clock input terminal of the another D flip-flop in the delay control signal generator 1510. Accordingly, when comparing the output control signal OUTPUT_CTR1 with the output control signal OUTPUT_CTR0, a signal Q_B1 indicating whether the output control signal OUTPUT_CTR1 is faster than the predetermined range may be output.

In an embodiment, the delay control signal output unit 1520 may include two D flip-flops. A delay control signal generated by the delay control signal generator 1510 may be input to a data input terminal of one of the D flip-flops in the delay control signal output unit 1520 and be latched into a D flip-flop.

A calibration enable signal CALIB_EN may be provided to (input to) the clock input terminals of both D flip-flops in the delay control signal output unit 1520. The latched delay control signals B0_FAST, B1_FAST may thus be output in response to the calibration enable signal CALIB_EN.

For example, the delay control signals output from the delay control signal output unit 1520 may correspond to a signal B0_FAST, which when it is a logic 1 Indicates whether the output control signal OUTPUT_CTR0 is faster than the predetermined range as compared with the output control signal OUTPUT_CTR1. A logic 1 signal B1_FAST indicates whether the output control signal OUTPUT_CTR1 is faster than the predetermined range as compared with the output control signal 0 OUTPUT_CTR0.

Although it is illustrated that each of the delay control signal generator 1510 and the delay control signal output unit 1520, which are shown in FIG. 4, includes D flip-flops, the present disclosure is not limited to their implementation using D flip-flops. The delay control signal generator 1510 may be implemented in various types of components capable of generating delay control signals by receiving output control signals OUTPUT_CTR and comparing the output control signals OUTPUT_CTR.

In addition, the delay control signal output unit 1520 may be implemented in various types of components capable of latching input delay control signals and outputting the latched signals in response to the calibration enable signal CALIB_EN. In addition, although the delay detecting circuit 1500 with respect to the output control signal OUTPUT_CTR0 and the output control signal OUTPUT_CTR1 has been described in FIG. 4, the delay detecting circuit 1500 may be equally applied to other output control signals OUTPUT_CTR.

Figure 5:
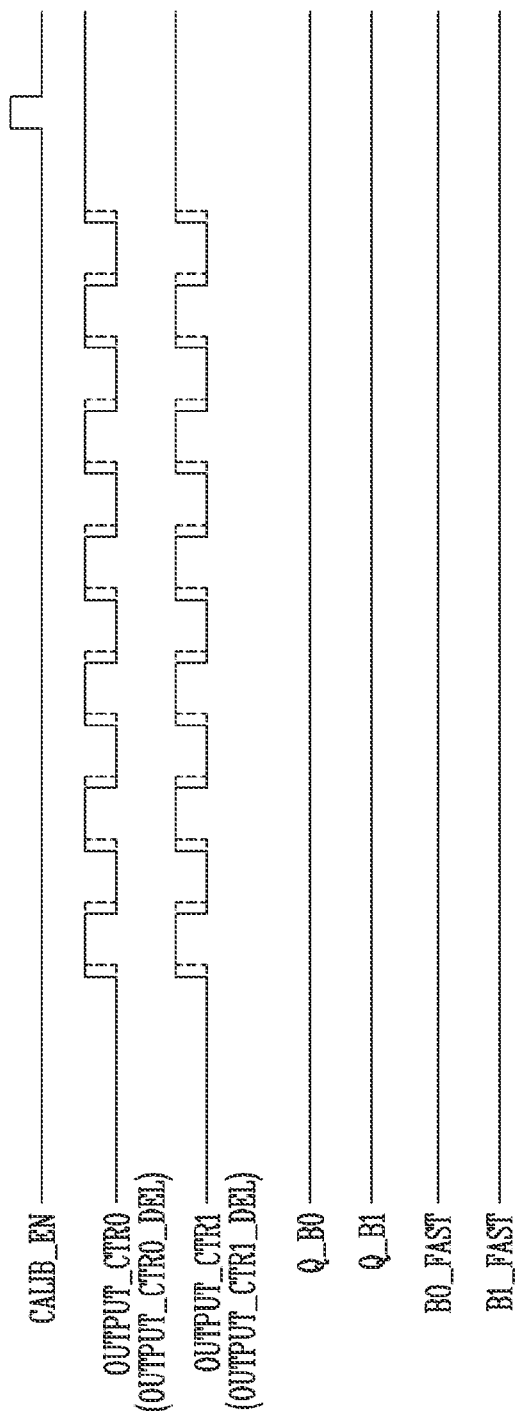
FIGS. 5 to 7 are timing diagrams illustrating an operation of the delay detecting circuit shown in FIG. 4.
Figure 6:
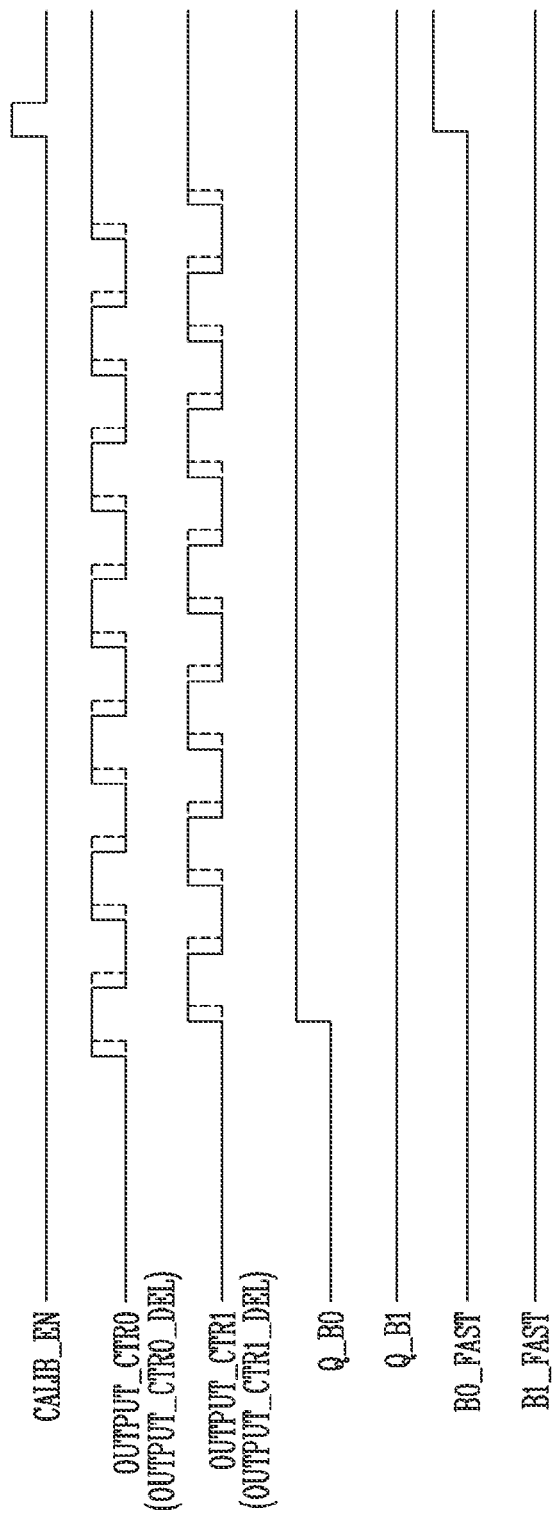
Figure 7:
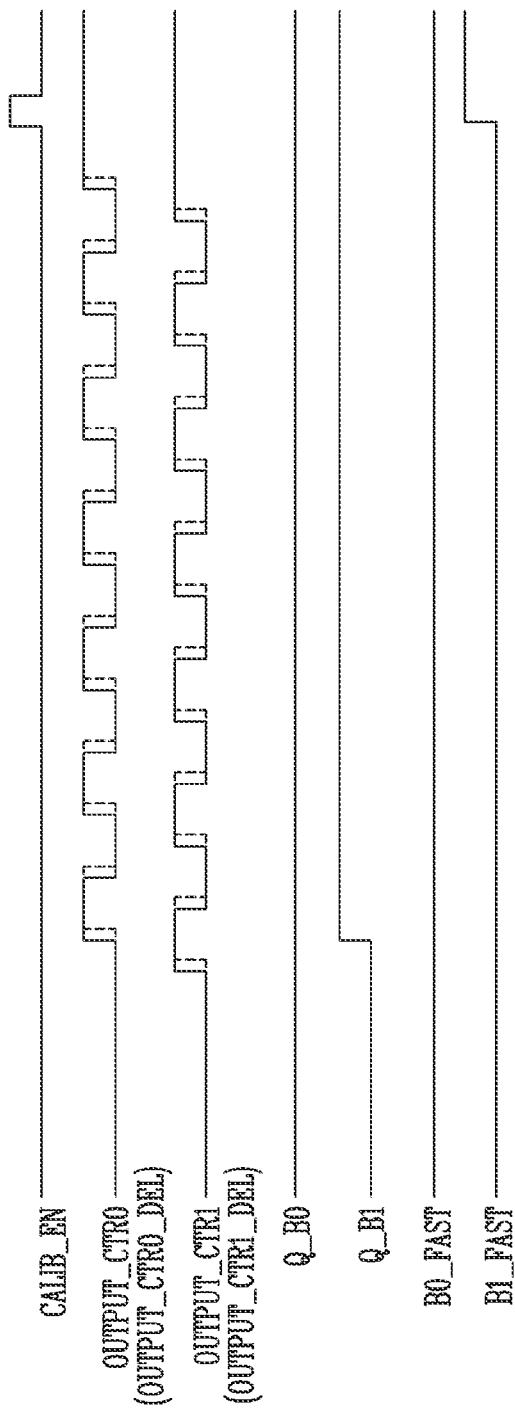

FIGS. 5 to 7 are timing diagrams illustrating an operation of the delay detecting circuit shown in FIG. 4.

Referring to FIGS. 4 and 5, the delay control signal generator 1510 may compare the delayed output control signal OUTPUT_CTR0_DEL with the output control signal OUTPUT_CTR1. As a comparison result, the delayed output control signal OUTPUT_CTR0_DEL is not faster than the output control signal OUTPUT_CTR1. Therefore, the delay control signal generator 1510 may generate a signal Q_B0 indicating that the output control signal OUTPUT_CTR0 is not faster than the predetermined range as compared with the output control signal OUTPUT_CTR1. For example, a signal having a low value may indicate that a target output control signal is not faster than a predetermined value as compared with a comparison output control signal. Therefore, the Q_B0 may have a low value.

The delay control signal generator 1510 may compare the delayed output control signal OUTPUT_CTR1_DEL with the output control signal OUTPUT_CTR0. As a comparison result, the delayed output control signal OUTPUT_CTR1_DEL is not faster than the output control signal OUTPUT_CTR0. Therefore, the delay control signal generator 1510 may generate a signal Q_B1 indicating that the output control signal OUTPUT_CTR1 is not faster than the predetermined range as compared with the output control signal OUTPUT_CTR0. Therefore, the Q_B1 may have a low value.

Each of the Q_B0 and Q_B1, which have these values, may be input to the delay control signal output unit 1520, so that values according to the Q_B0 and Q_B1 are latched. As the calibration enable signal CALIB_EN is input, data latched to the delay control signal output unit 1520 may be output as B0_FAST and B1_FAST as delay control signals. That is, since the value latched to the delay control signal output unit 1520 is a low value, both the B0_FAST and B1_FAST may be output as low values.

Referring to FIGS. 4 and 6, the delay control signal generator 1510 may compare the delayed output control signal OUTPUT_CTR0_DEL with the output control signal OUTPUT_CTR1. As a comparison result, the delayed output control signal OUTPUT_CTR0_DEL is faster than the output control signal OUTPUT_CTR1. Therefore, the delay control signal generator 1510 may generate a signal Q_B0 indicating that the output control signal OUTPUT_CTR0 is faster than the predetermined range as compared with the output control signal OUTPUT_CTR1. For example, a signal having a high value may indicate that a target output control signal is faster than a predetermined value as compared with a comparison output control signal. Therefore, the Q_B0 may have a high value.

The delay control signal generator 1510 may compare the delayed output control signal OUTPUT_CTR1_DEL with the output control signal OUTPUT_CTR0. As a comparison result, the delayed output control signal OUTPUT_CTR1_DEL is not faster than the output control signal OUTPUT_CTR0. Therefore, the delay control signal generator 1510 may generate a signal Q_B1 indicating that the output control signal OUTPUT_CTR1 is not faster than the predetermined range as compared with the output control signal OUTPUT_CTR0. Therefore, the Q_B1 may have a low value.

Each of the Q_B0 and Q_B1, which have these values, may be input to the delay control signal output unit 1520, so that values according to the Q_B0 and Q_B1 are latched. As the calibration enable signal CALIB_EN is input, data latched to the delay control signal output unit 1520 may be output as B0_FAST and B1_FAST as delay control signals. That is, since the value latched to the delay control signal output unit 1520 is a high value due to the Q_B0, the B0_FAST may be output as a high value. In addition, since the value latched to the delay control signal output unit 1520 is a low value due to the Q_B1, the B1_FAST may be output as a low value.

Referring to FIGS. 4 and 7, the delay control signal generator 1510 may compare the delayed output control signal OUTPUT_CTR0_DEL with the output control signal OUTPUT_CTR1. As a comparison result, the delayed output control signal OUTPUT_CTR0_DEL is not faster than the output control signal OUTPUT_CTR1. Therefore, the delay control signal generator 1510 may generate a signal Q_B0 indicating that the output control signal OUTPUT_CTR0 is not faster than the predetermined range as compared with the output control signal OUTPUT_CTR1. Therefore, the Q_B0 may have a low value.

The delay control signal generator 1510 may compare the delayed output control signal OUTPUT_CTR1_DEL with the output control signal OUTPUT_CTR0. As a comparison result, the delayed output control signal OUTPUT_CTR1_DEL is faster than the output control signal OUTPUT_CTR0, and therefore, the delay control signal generator 1510 may generate a signal Q_B1 indicating that the output control signal OUTPUT_CTR1 is faster than the predetermined range as compared with the output control signal OUTPUT_CTR0. Therefore, the Q_B1 may have a high value.

Each of the Q_B0 and Q_B1, which have these values, may be input to the delay control signal output unit 1520, so that values according to the Q_B0 and Q_B1 are latched. As the calibration enable signal CALIB_EN is input, data latched to the delay control signal output unit 1520 may be output as B0_FAST and B1_FAST as delay control signals. That is, since the value latched to the delay control signal output unit 1520 is a low value due to the Q_B0, the B0_FAST may be output as a low value. In addition, since the value latched to the delay control signal output unit 1520 is a high value due to the Q_B1, the B1_FAST may be output as a high value.

Figure 8:
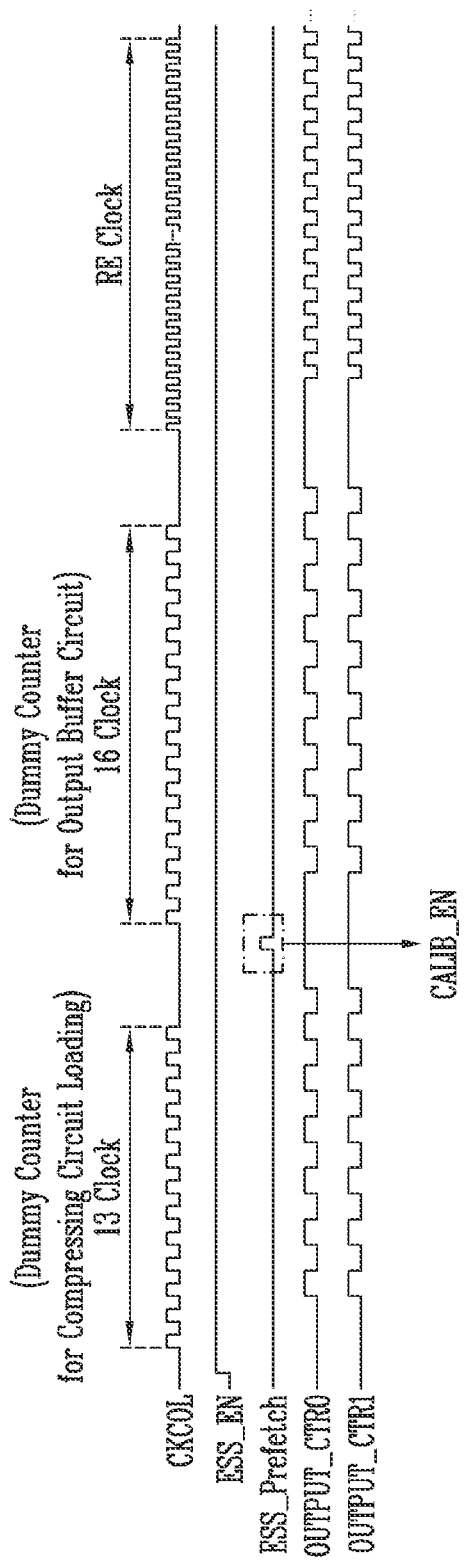
FIG. 8 is a timing diagram illustrating signals provided to the memory device in accordance with an embodiment of the present disclosure.

FIG. 8 is a timing diagram illustrating signals provided to the memory device in accordance with an embodiment of the present disclosure.

Referring to FIGS. 1, 4, and 8, at an initial stage of the compression read operation, a predetermined number of clocks CKCOL may be generated to load the compressing circuit 1200. For example, as shown in FIG. 8, when the compression read operation is performed as the compression read enable signal ESS_EN is received, 13 initial clocks may correspond to a "dummy period" in which compressing circuit 1200 loading is performed. Dummy data may be output during the dummy period. When the dummy period is completed, a prefetch signal ESS_Prefetch indicating that the dummy period has been completed may be provided.

In accordance with an embodiment of the present disclosure, the dummy period may be used as a training period for calibrating output control signals OUTPUT_CTR. Also during the dummy period, the signal ESS_Prefetch indicating that the dummy period has been completed may be used as the calibration enable signal CALIB_EN. For example, the delay detecting circuit 1500 may compare output control signal OUTPUT_CTR0 and output control signal OUTPUT_CTR1, which are received during the dummy period. A delay control signal DELAY_CTR generated as a comparison result may be output as the prefetch signal ESS_Prefetch is received. As a result, from the dummy period, data may be output and merged in response to calibrated output control signals OUTPUT_CTR0 and OUTPUT_CTR1.

Figure 9:
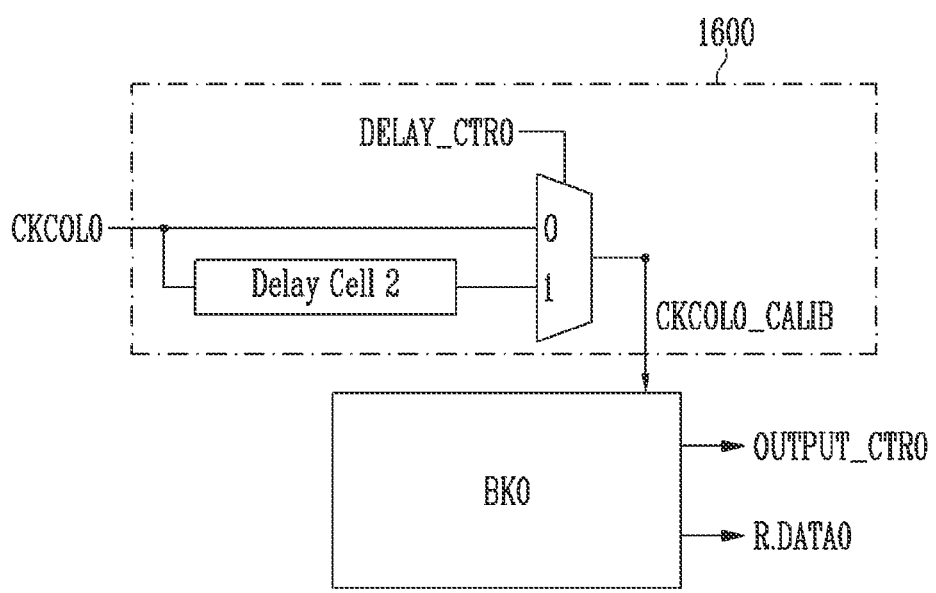
FIG. 9 is a diagram illustrating an example of a compensating circuit shown in FIG. 1.

FIG. 9 is a diagram illustrating an example of the compensating circuit shown in FIG. 1.

Referring to FIG. 9, clock signal CKCOL0 to be provided to the bankBK0 may be input to the compensating circuit 1600. The clock signal CKCOL0 may be generated by an internal power source of the memory device 1000 or be provided from the outside.

The compensating circuit 1600 may include a delay circuit Delay Cell 2, and delay the clock signal CKCOL0 input through the delay circuit Delay Cell 2. The compensating circuit 1600 may receive the delay control signal DELAY_CTR0 output from the delay detecting circuit 1500 and output a calibrated clock signal CKCOL0_CAL1B, based on the received delay control signal DELAY_CTR0. In an embodiment, the calibrated clock signal CKCOL0_CAL1B may be a signal obtained by delaying or not delaying the clock signal CKCOL0 input to the compensating circuit 1600 according to the delay control signal DELAY_CTR0.

Accordingly, output control signal OUTPUT_CTR0 may be output based on the calibrated clock signal CKCOL0_CAL1B in the bank BK0. That is, the output control signal OUTPUT_CTR0 generated based on the calibrated clock signal CKCOL0_CAL1B may be different from an output control signal generated from clock signal CKCOL_B0 which is not calibrated.

That is, the clock signal CKCOL provided to the memory bank 1100 is calibrated according to the delay control signal DELAY_CTR, so that an output control signal OUTPUT_CTR generated based on the clock signal can be indirectly calibrated. As such, the configuration of the compensating circuit 1600 for indirectly calibrating the output control signal OUTPUT_CTR is not limited to the example shown in FIG. 9. That is, various components in which the clock signal CKCOL and the delay control signal DELAY_CTR can be input, and the clock signal CKCOL can be changed according to the delay control signal DELAY_CTR may all be applied as implementation examples. In addition, although the compensating circuit 1600 with respect to the bank BK0 has been described in FIG. 9, the compensating circuit 1600 may be equally applied to other memory banks 1100.

Figure 10:
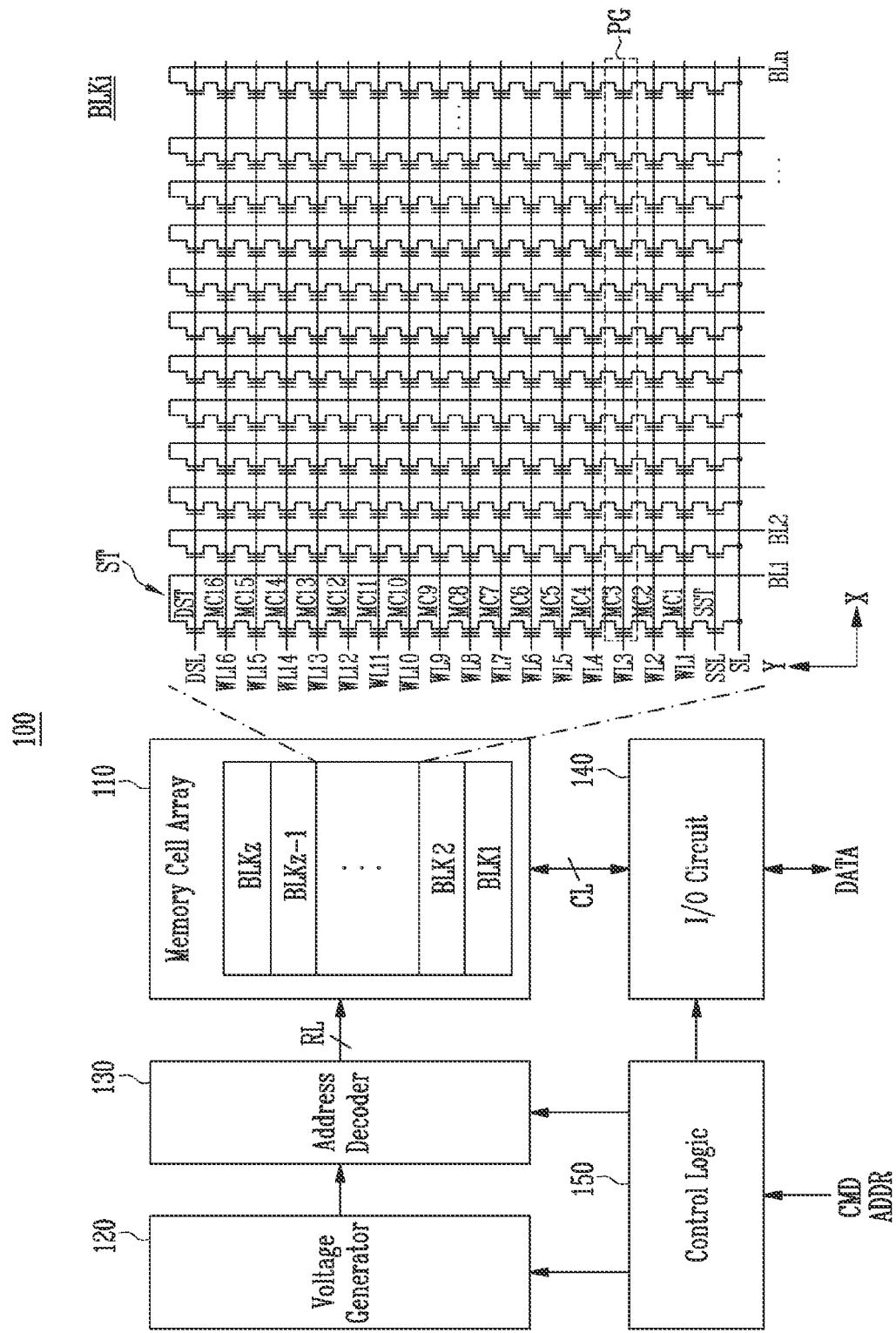
FIG. 10 is a block diagram illustrating another embodiment of the memory device shown in FIG. 1.

FIG. 10 is a block diagram illustrating an embodiment of the memory device shown in FIG. 1.

Referring to FIG. 10, a memory device 100 may include a memory cell array 110, a voltage generator 120, an address decoder 130, an input/output circuit 140, and a control logic 150.

The memory cell array 110 may include a plurality of memory blocks BLK1 to BLKz. The plurality of memory blocks BLK1 to BLKz, may be connected to the address decoder 130 through row lines RL. The plurality of memory blocks BLK1 to BLKz may be connected to the input/output circuit 140 through column lines CL. In an embodiment, the row lines RL may include word lines, source select lines, and drain select lines. In an embodiment, the column lines may include bit lines.

Each memory block BLK of the plurality of memory blocks BLK1 to BLKz includes a plurality of memory cells MCn. In an embodiment, each memory cell MCn of the plurality of memory cells MCn-m may be a nonvolatile memory cell.

In any one memory block BLKi among the plurality of memory blocks BLK1-BLKz, a word lines arranged in parallel to each other may be connected between a first select line and a second select line. The first select line may be a source select line SSL. The second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

As shown in FIG. 10, the string ST may include a source select transistor SST, a plurality of serially-connected memory cells MC1 to MC16, and a drain select transistor DST, all of which are connected in series to each other between a source line SL and a first bit line BL1. At least one source select transistor SST and at least one drain select transistor DST may be included in one string ST, and memory cells a number of which is greater than the number of the memory cells MC1 to MC16 shown in the drawing may be included in the one string ST.

A source of the source select transistor SST may be connected to the source line SL. The drain of the drain select transistor DST may be connected to the first bit line BL1.

The memory cells MC1 to MC16 may be connected in series between the source select transistor SST and the drain select transistor DST. Gates of source select transistors SST included in different strings ST may be connected to the source select line SSL. Gates of drain select transistors DST included in different strings ST may be connected to the drain select line DSL.

The gate of a transistor comprising one of the memory cells MC1 to MC16 may be connected to a corresponding word line of a plurality of word lines WL1 to WL16.

A group of memory cells MC connected to the same word line WL in different strings ST may be referred to as a physical page PPG. Therefore, physical pages PPG of which number corresponds to the number of the word lines WL1 to WL16 may be included in the memory block BLKi.

Each memory cell MC may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The SLC may store one-bit data. One physical page PPG of the SLC may store one logical page of data. One logical page of data may include data bits, the number of which corresponds to the number of cells included in one physical page PPG.

The MLC, the TLC, and the QLC may store two-or-more-bit data. One physical page PPG may store two or more logical page data.

The memory cell array 110 may be configured with a plurality of memory banks, each memory bank including a plurality of memory blocks. The memory banks may be identical to the memory bank 1100 described in FIG. 1.

In an embodiment, the voltage generator 120, the address decoder 130, and the input/output circuit 140 may be commonly designated as a peripheral circuit. The peripheral circuit may drive the memory cell array 110 under the control of the control logic 150. The peripheral circuit may cause the memory cell array 110 to perform a program operation, a read operation, and an erase operation.

The voltage generator 120 may generate a plurality of operating voltages by using an external power voltage supplied to the memory device 100. The voltage generator 120 may be operated under the control of the control logic 150.

In an embodiment, the voltage generator 120 may generate an internal-power voltage by regulating the external power voltage. The internal power voltage generated by the voltage generator 120 may be used as an operating voltage of the memory device 100.

In an embodiment, the voltage generator 120 may generate a plurality of operating voltages by using either the external power voltage or the internal power voltage. The voltage generator 120 may generate various voltages required in the memory device 100. For example, the voltage generator 120 may generate a plurality of erase voltages, a plurality of program voltages, a plurality of pass voltages, a plurality of select read voltages, and a plurality of unselect read voltages.

In order to generate a plurality of operating voltages having various voltage levels, the voltage generator 120 may include a plurality of clamping capacitors which receive the internal power voltage. The voltage generator 120 may generate the plurality of operating voltages by selectively enabling the plurality of pumping capacitors under the control of the control logic 150.

The plurality of operating voltages generated by the voltage generator 120 may be supplied to the memory cell array 110 by the address decoder 130.

The address decoder 130 may be connected to the memory cell array 110 through the row lines RL. The address decoder 130 may be operated under the control of the control logic 150. The address decoder 130 may receive an address ADDR from the control logic 150. The address decoder 130 may decode a block address in the received address ADDR. The address decoder 130 may select at least one memory block among the plurality of memory blocks BLK1 to BLKi according to the decoded block address. The address decoder 130 may decode a row address in the received address ADDR. The address decoder 130 may select at least one word line among word lines of the selected memory block according to the decoded row address. In an embodiment, the address decoder 130 may decode a column address in the received address ADDR. The address decoder 130 may connect the input/output circuit 140 and the memory cell array 110 to each other according to the decoded column address.

The address decoder 130 may include components such as a row decoder circuit, a column decoder circuit, and an address decoder circuit.

The Input/output circuit 140 may include a plurality of page buffers. The plurality of page buffers may be connected to the memory cell array 110 through the bit lines. In a program operation, data may need to be stored in selected memory cells according to data stored in the plurality of page buffers. In a read operation, the data stored in the selected memory cells may need to be sensed through the bit lines, and the sensed data may need to be stored in the page buffers.

The input/output circuit 140 may include a plurality of data compressing circuits. The data compressing circuits may be connected to a plurality of page buffers. More specifically, each of the data compressing circuits may be connected to page buffers connected to memory banks corresponding thereto. The data compressing circuits may be identical to the compressing circuits 1200 described in FIG. 1. The compressing circuits 1200 may compress and output data read from the memory cell array 110 when a compression read operation is performed under the control of the control logic 150.

The input/output circuit 140 may include a plurality of first merge circuits and a second merge circuit. The first merge circuit may be connected to two or more compressing circuits, and the second merge circuit may be connected to two or more first merge circuits. The first merge circuit and the second merge circuit may be identically to the first merge circuit 1300 and the second merge circuit 1400, which are described in FIG. 1. The first merge circuit may merge and output data output from compressing circuits, and the second merge circuit may merge and output data output from first merge circuits.

The input/output circuit 140 may include a delay detecting circuit and a compensating circuit. The delay detecting circuit may be directly/indirectly connected to the memory cell array 110 to receive output control signals output from the memory cell array 110. In addition, the compensating circuit may be connected to the delay detecting circuit, and be directly/indirectly connected to the memory cell array 110 to calibrate the output control signals output from the memory cell array 110. The delay detecting circuit and the compensating circuit may be identical to the delay detecting circuit 1500 and the compensating circuit 1600, which are described in FIG. 1. The delay detecting circuit may generate and output a delay control signal by comparing the output control signals output from the memory cell array 110, and the compensating circuit may calibrate the output control signals, based on the received delay control signal.

The control logic 150 may control the address decoder 130, the voltage generator 120, and the input/output circuit 140. The control logic 150 may be operated in response to a command CMD transferred from an external device. The control logic 150 may control the peripheral circuit by generating control signals in response to the command CMD and the address ADDR. The control logic 150 may control the peripheral circuit such that the memory device 100 performs a normal read operation or the compression read operation.

Figure 11:
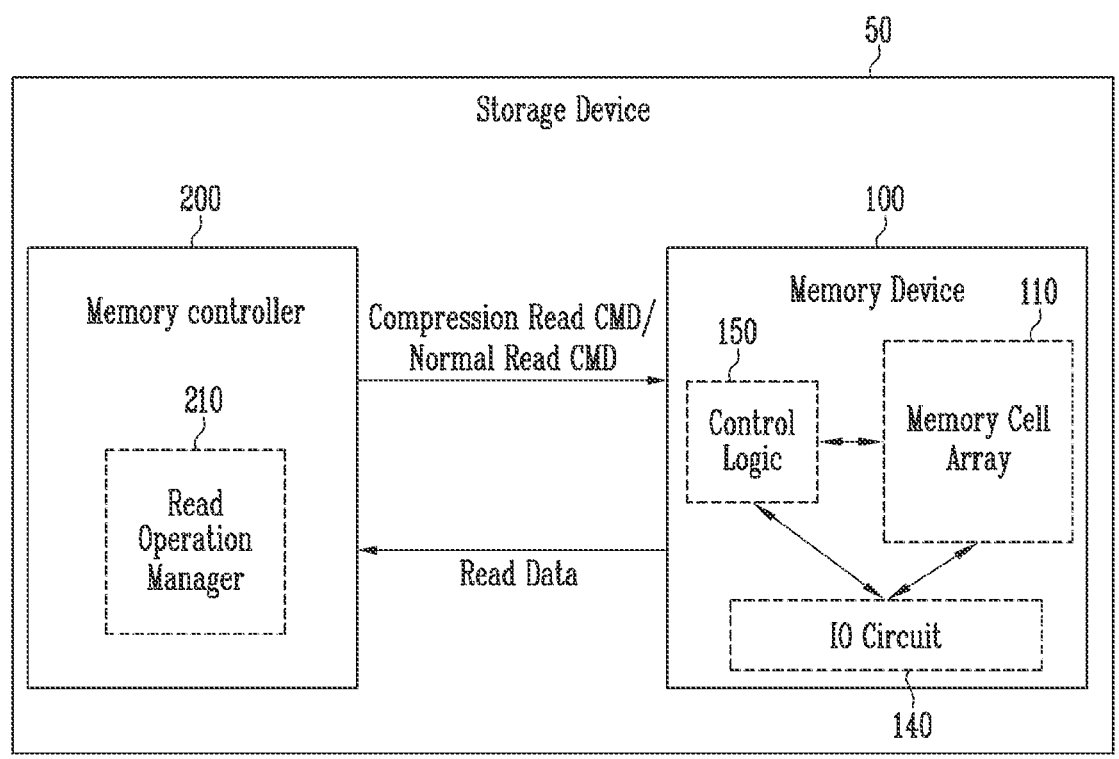
FIG. 11 is a block diagram illustrating a storage device including a memory device in accordance with an embodiment of the present disclosure.

FIG. 11 is a block diagram illustrating a storage device including a memory device in accordance with an embodiment of the present disclosure.

Referring to FIG. 11, the storage device 50 may include a memory device 100 and a memory controller 200. The storage device 50 may be a device for storing data under the control of a host, such as a mobile phone, a smart phone, an MP3 player, a laptop computer, a desktop computer, a game console, a TV, a tablet PC or an in-vehicle infotainment. Alternatively, the storage device 50 may be a device for storing data under the control of the host for storing high-capacity data in one place, such as a server or a data center.

The storage device 50 may be manufactured as any one of various types of storage devices according to a host interface that is a communication scheme with the host. Also, the storage device 50 may be manufactured as any one of various kinds of package types.

The memory device 100 may store data and may operate under the control of the memory controller 200. The memory device 100 may be the memory device 1000 shown in FIG. 1 or it may be the memory device 100 shown in FIG. 10. Therefore, the memory device 100 may include a memory cell array 100 including a plurality of memory cells, an input/output (I/O) circuit 140 which is connected to the memory cell array 110 and outputs data read from the memory cells, and a control logic 150 which controls a peripheral circuit.

The memory cell array 110 may include a plurality of memory banks with each memory bank including a plurality of memory blocks. Each of the memory blocks may include a plurality of pages. In an embodiment, a page may be a unit for storing data in the memory device 100 or a unit for reading data stored in the memory device 100. The memory block may also be a unit for erasing data.

In an embodiment, the memory device 100 may be any one of various types of volatile memories or nonvolatile memories. In this specification, for convenience of description, a case where the memory device 100 is a NAND flash memory is assumed and described.

The memory device 100 may receive a command and an address from the memory controller 200, and access an area selected by the address in the memory cell array. The memory device 100 may perform an operation on a memory area selected or determined by an address portion of the command. For example, the memory device 100 may perform a write operation (program operation), a read operation, and an erase operation. In the program operation, the memory device 100 may program data in an area selected by an address provided with or as part of the program operation command. In the read operation, the memory device 100 may read data from the area selected by the address. In the erase operation, the memory device 100 may erase data stored in the area selected by the address.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host and the memory device 100.

In an embodiment, the memory controller 200 may receive a Logical Address (LA) input from the host, and translate the LA into a Physical Address (PA) indicating addresses of memory cells in the memory device 100, in which data is to be stored or from which data is to be read.

The memory controller 200 may control the memory device 100 to perform a write operation, a read operation, an erase operation, or the like in response to a request from the host. In the program operation, the memory controller 200 may provide a write command, a PA, and data to the memory device 100. In the read operation, the memory controller 200 may provide a read command and a PA to the memory device 100. In the erase operation, the memory controller 200 may provide an erase command and a PA to the memory device 100.

In an embodiment, the memory controller 200 may autonomously generate a command, an address, and data regardless of any request from the host, and transmit the command, the address, and the data to the memory device 100. For example, the memory controller 200 may provide the memory device 100 with a command, an address, and data, which are used to perform program, read and erase operations accompanied in performing wear leveling, read reclaim, garbage collection, and the like.

In an embodiment, the memory controller 200 may control at least two memory devices 100. The memory controller 200 may control the memory devices according to an interleaving scheme so as to improve operational performance. The interleaving scheme may be a scheme for controlling operations on at least two memory devices 100 to overlap with each other.

In an embodiment, the memory controller 200 may include a read operation manager 210. The read operation manager 210 may control the memory device 100 to perform a compression read operation or a normal read operation. For example, the read operation manager 210 may determine whether the memory device 100 is to perform the compression read operation or the normal read operation, and provide a compression read command or a normal read command to the memory device 100 according to whether the memory device 100 is to perform the compression read operation or the normal read operation. The control logic 150 may control the peripheral circuit including the I/O circuit 140 to perform the compression read command or the normal read operation in response to the received command. Accordingly, data read from the memory cell array 110 may be output to the memory controller 200 through the I/O circuit 140. When the memory device 100 receives the compression read command, the I/O circuit 140 may provide the memory controller 200 with read data compressed through a compression operation. When the memory device 100 receives the normal read command, the I/O circuit 140 may provide the memory controller 200 with read data which does not go through the compression operation.

In an embodiment, the compression read operation may be performed using an Efficient Soft Sensing (ESS) scheme. The ESS scheme may be a scheme of simultaneously compressing data of a plurality of areas in the memory cell array 110, and merging and outputting the compressed data together.

Figure 12:
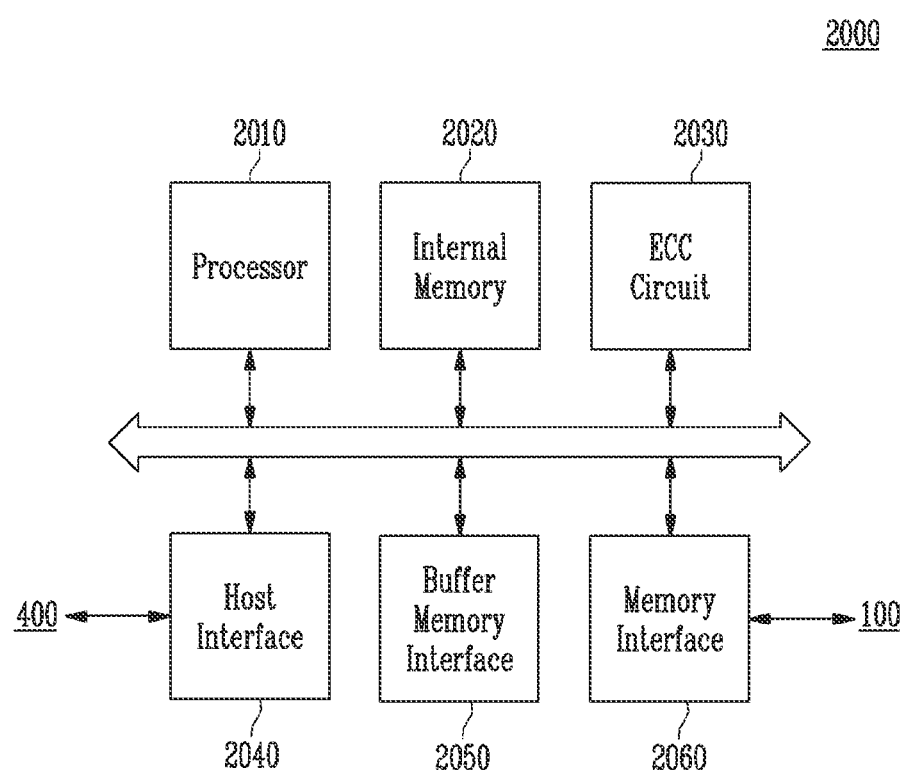
FIG. 12 is a diagram illustrating another embodiment of a memory controller shown in FIG. 11.

FIG. 12 is a diagram illustrating another embodiment of the memory controller shown in FIG. 11.

Referring to FIG. 12, a memory controller 2000 may include a processor 2010, an internal memory 2020, an Error Checking & Correcting (ECC) circuit 2030, a host interface 2040, a buffer memory interface 2050, and a memory interface 2060.

The processor 2010 may perform various calculations for controlling the memory device 100 or generate various commands. When the processor 2010 receives a request from the host 400, the processor 2010 may generate a command according to the received request, and transmit the generated command to a queue controller (not shown). The processor 2010 may control a next operation on the memory device 100, based on a verify result which the memory interface 2060 receives from the memory device 100. In an embodiment, the processor 2010 may generate a normal read command or a compression read command.

The internal memory 2020 may store various information necessary for an operation of the memory controller 2000. For example, the internal memory 2020 may include logical and physical address map tables.

The ECC circuit 2030 is configured to detect and correct an error of data received from the memory device 100 by using an error correction code. The processor 2010 may adjust a read voltage according to an error detection result of the ECC circuit 2030, and control the memory device 100 to perform re-reading. In an exemplary embodiment, an error correction block may be provided as a component of the memory controller 2000.

The host interface 2040 may exchange commands, addresses, data, and the like between the memory controller 2000 and the host 400. For example, the host interface 2040 may receive requests, addresses, data, and the like from the host 400, and output data read from the memory device 100 to the host 400. The host interface 2040 may communicate with the host 400, using various protocols.

The buffer memory interface 2050 may transfer data between the processor 2010 and a buffer memory (not shown). The buffer memory may be used as a working memory or a cache memory of the memory controller 2000, and store data used in the storage device. The buffer memory may be used as a read buffer, a write buffer, a map buffer, or the like by the processor 2010.

The memory interface 2060 may exchange commands, addresses, data, and the like between the memory controller 2000 and the memory device 100. For example, the memory interface 2060 may transmit commands, addresses, data, and the like to the memory device 100 through a channel, and receive data and the like from the memory device 100. The memory interface 2060 may provide the compression read command or the normal read command to the memory device 100 according to an instruction of the processor 2010. Accordingly, the memory interface 2060 may receive compression read data or normal read data from the memory device 100.

Figure 13:
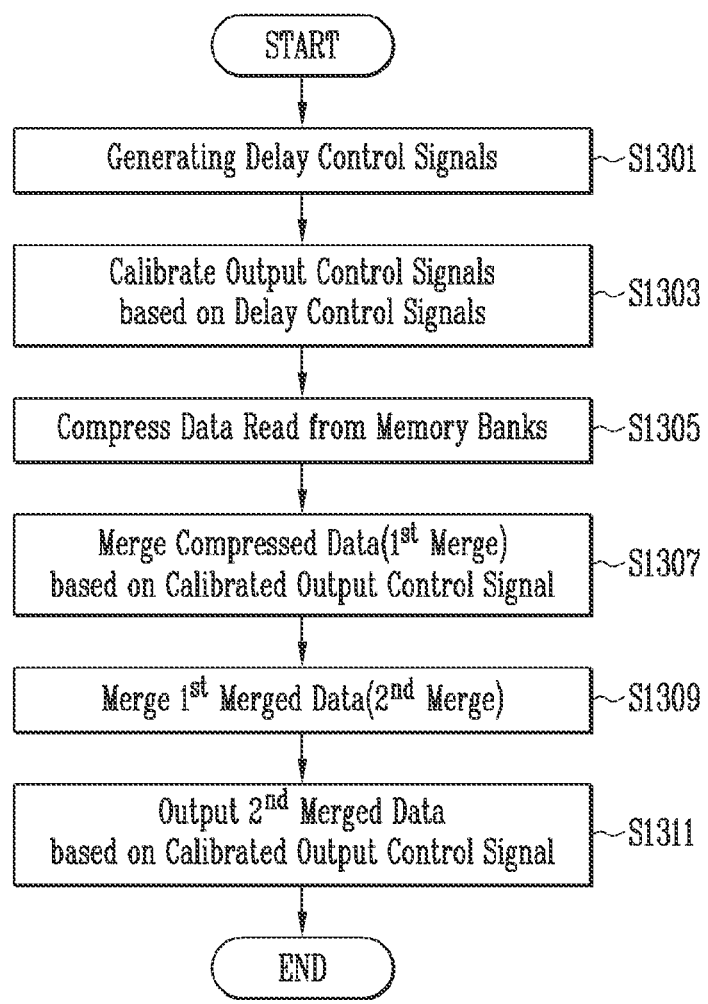
FIG. 13 is a flowchart illustrating an operating method of a memory device in accordance with an embodiment of the present disclosure.

FIG. 13 is a flowchart illustrating an operating method of a memory device in accordance with an embodiment of the present disclosure.

Referring to FIGS. 1 and 13, in operation step S1301, the delay detecting circuit 1500 of the memory device 1000 may generate a delay control signal DELAY_CTR, based on output control signals OUTPUT_CTR output from the plurality of memory banks 1100. In an embodiment, the delay detecting circuit 1500 may compare the output control signals OUTPUT_CTR, thereby generating the delay control signal DELAY_CTR. In an embodiment, the delay control signal DELAY_CTR may be generated in a training operation period of a compression read operation, in which dummy data is output, but the present disclosure is not limited to this period.

In operation step S1303, the compensating circuit 1600 of the memory device 1000 may calibrate output control signals OUTPUT_CTR, based on the delay control signal DELAY_CTR. In an embodiment, the compensating circuit 1600 may delay the output control signals OUTPUT_CTR, based on the delay control signal DELAY_CTR, thereby calibrating the output control signals OUTPUT_CTR.

In operation step S1305, the compressing circuits 1200 of the memory device 1000 may compress read data R.DATA provided from the memory banks 1100, and accordingly, compressed data C.DATA may be output from the compressing circuits 1200.

In operation step 1307, the first merge circuits 1300 of the memory device 1000 may merge the compressed data C.DATA, based on the output control signals OUTPUT_CTR calibrated in the operation S1303, and the merging of the compressed data C.DATA, which is performed by the first merge circuits 1300, may be designated as first merging. In an embodiment, the compressed data C.DATA output from the compressing circuits 1200 may be latched to the first merge circuit 1300, and first merged data $1^{st}$ M.DATA may be output as the latched data is output from the first merge circuits 1300 in response to the calibrated output control signals OUTPUT_CTR.

In operation step S1309, the second merge circuit 1400 of the memory device 1000 may merge the first merged data $1^{st}$ M.DATA, and the merging of the first merged data $1^{st}$ M.DATA, which is performed by the second merge circuit 1400, may be designated as second merging. The second merge circuit 1400 may output, to the output buffer circuit 1700, second merged data $2^{nd}$ M.DATA obtained by merging the first merged data $1^{st}$ M.DATA.

In operation step S1311, the output buffer circuit 1700 of the memory device 1000 may merge the first merged data $1^{st}$ M.DATA, based on the output control signals OUTPUT_CTR calibrated in the operation S1303. In an embodiment, the second merged data $2^{nd}$ M.DATA output from the second merge circuit 1400 may be latched to the output buffer circuit 1700, and the latched data may be output from the output buffer circuit 1700 in response to the calibrated output control signals OUTPUT_CTR.

Figure 14:
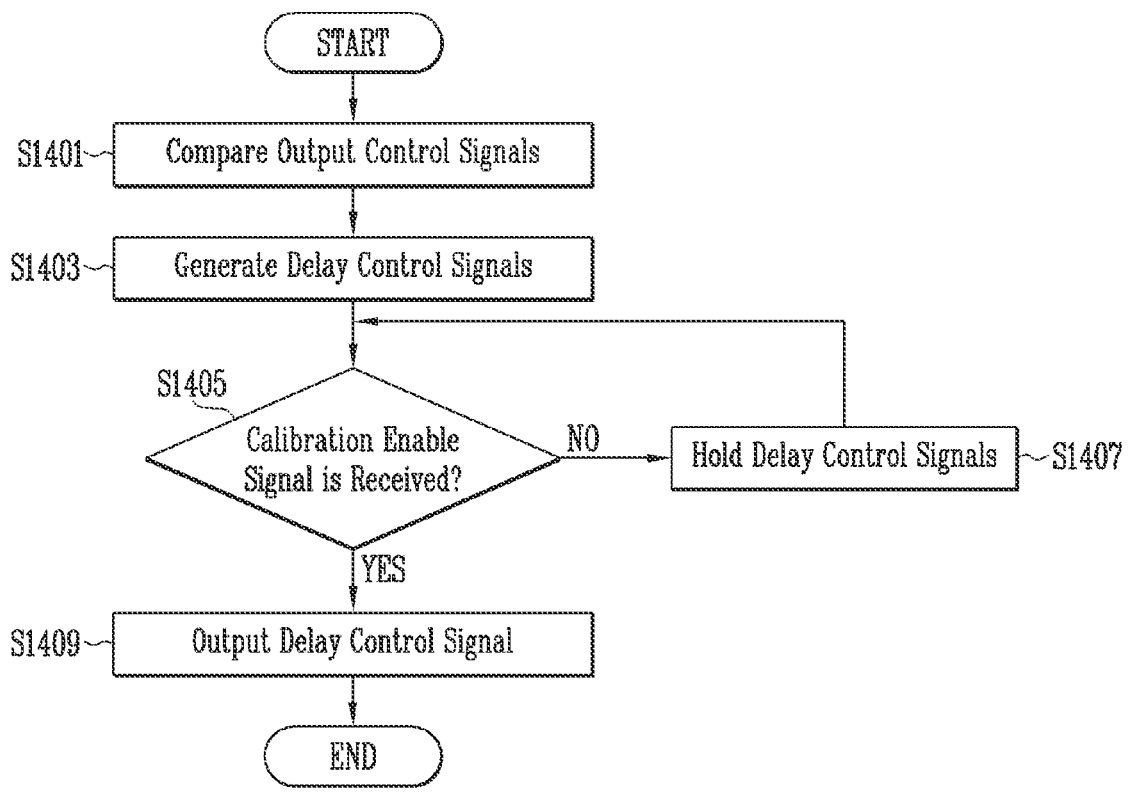
FIG. 14 is a flowchart illustrating in more detail a process of outputting a delay control signal in the operating method of the memory device in accordance with an embodiment of the present disclosure.

FIG. 14 is a flowchart illustrating in more detail a process of outputting a delay control signal in the operating method of the memory device in accordance with an embodiment of the present disclosure. Operations shown in FIG. 14 may correspond to the operation S1301 shown in FIG. 13.

Referring to FIGS. 13 and 14, in operation step S1401, the delay detecting circuit 1500 of the memory device 1000 may compare output control signals output from the plurality of memory banks 1100. In an embodiment, the delay detecting circuit 1500 may compare output control signals corresponding to first merged data on which the second merging is performed. In an embodiment, the delay detecting circuit 1500 may compare a delay difference between the corresponding output control signals.

In operation step S1403, the delay detecting circuit 1500 may generate a delay control signal, based on a result obtained by comparing the output control signals. In an embodiment, the delay control signal may indicate whether the delay difference between the output control signals is out of a predetermined range.

The generated delay control signal may be latched to the delay detecting circuit 1500, and check whether a calibration enable signal has been received in operation S1405. In an embodiment, when a period in which dummy data is output in the compression read operation is used for a training operation, a training operation completion signal, indicating that the training operation has been completed, i.e., a signal indicating that a dummy data output period has been ended, may be used as the calibration enable signal.

When it is checked that the calibration enable signal has not been received in operation S1405, in operation S1407, the delay detecting circuit 1500 may hold the latched delay control signal, and repeatedly check whether the calibration enable signal has been received.

When it is checked that the calibration enable signal has been received in the operation S1405, in operation S1409, the delay detecting circuit 1500 may output the latched delay control signal.

Figure 15:
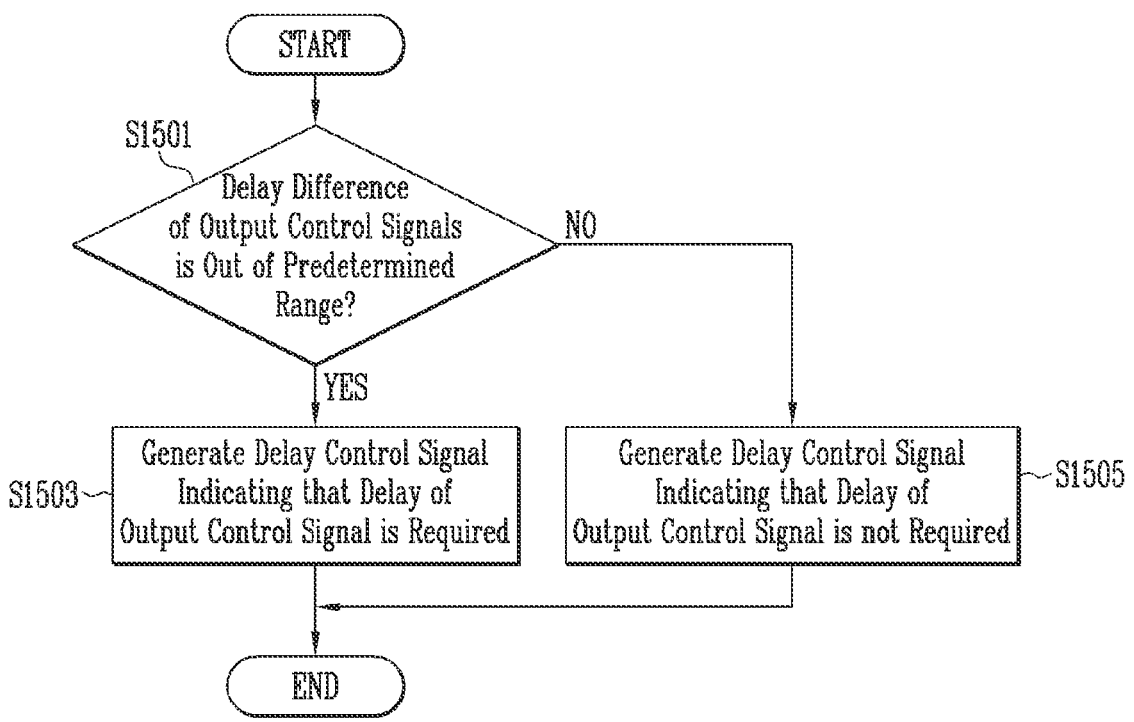
FIG. 15 is a flowchart illustrating in more detail a process of generating a delay control signal in the operating method of the memory device in accordance with an embodiment of the present disclosure.

FIG. 15 is a flowchart illustrating in more detail a process of generating a delay control signal in the operating method of the memory device in accordance with an embodiment of the present disclosure. Operations shown in FIG. 15 may correspond to the operations S1401 and S1403 shown in FIG. 14.

Referring to FIGS. 14 and 15, in operation S1501, the delay detecting circuit 1500 of the memory device 1000 may check whether a delay difference between a target output control signal and a comparison output control signal is out of a predetermined range.

When it is decided that the delay difference between the output control signals is out of the predetermined range in the operation S1501, in operation S1503, the delay detecting circuit 1500 may generate a delay control signal indicating that a delay of the target output control signal is required. When it is decided that the delay difference between the output control signals is not out of the predetermined range in the operation S1501, in operation S1505, the delay detecting circuit 1500 may generate a delay control signal indicating that the delay of the target output control signal is not required.

Figure 16:
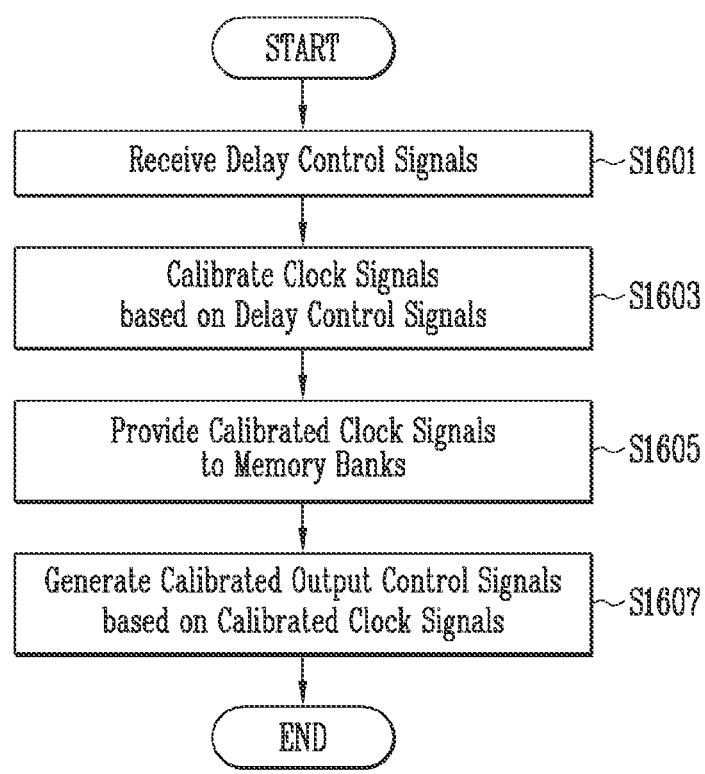
FIG. 16 is a flowchart illustrating an example in which an output control signal is corrected in the operating method of the memory device in accordance with an embodiment of the present disclosure.

FIG. 16 is a flowchart illustrating an example in which an output control signal is corrected in the operating method of the memory device in accordance with an embodiment of the present disclosure. Operations shown in FIG. 16 may correspond to the operation S1303 shown in FIG. 13.

Referring to FIGS. 13 and 16, in operation S1601, the compensating circuit 1600 of the memory device 1000 may receive a delay control signal output from the delay detecting circuit 1500.

In operation step S1603, the compensating circuit 1600 may calibrate clock signals to be provided to the memory banks 1100, based on the delay control signal. In an embodiment, the compensating circuit 1600 may or may not delay the clock signals to be provided to the memory banks 1100 according to the delay control signal.

In operation step S1605, the clock signals calibrated by the compensating circuit 1600 may be provided to the memory banks 1100. Accordingly, in operation S1607, calibrated output control signals may be generated based on the calibrated clock signals provided to the memory banks 1100. The calibrated output control signals may be output together with read data from the memory banks 1100. The calibrated output control signals may be provided to the first merge circuit 1300, the second merge circuit 1400, and/or the output buffer circuit 1700 to be used for merging and outputting of data.

That is, in the operating method shown in FIG. 16, the compensating circuit 1600 calibrates clock signals to be provided to the memory banks 1100, and calibrated output control signals are generated from the calibrated clock signals. Hence, the compensating circuit 1600 may indirectly calibrate output control signals.

In accordance with the present disclosure, there can be provided a memory device and an operating method of a memory device, which can reduce or prevent a merge failure which may occur in a merge process of data when a compression read operation is performed.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
   a plurality of memory banks, each memory bank including a plurality of memory blocks;
   a plurality of compressing circuits, each compressing circuit connected to at least one memory bank, each compressing circuit outputting compressed data by compressing data read from said at least one memory bank;
   a plurality of first merge circuits, each first merge circuit being configured to receive output control signals from at least one compressing circuit, each first merge circuit generating first merged data by merging compressed data output from said at least one compressing circuit;
   a second merge circuit configured to receive first merged data from different first merge circuits and configured to output second merged data by merging the first merged data received from said different first merge circuits;
   a delay detecting circuit configured to receive the output control signals, and generate delay control signals by comparing the output control signals;
   a compensating circuit configured to calibrate the output control signals, responsive to the delay control signal; and
   an output buffer circuit configured to latch the second merged data, and output the second merged data, responsive to at least one of the output control signals.

2. The memory device of claim 1, wherein the delay detecting circuit is configured to compare output control signals when a training operation in which dummy data is output from the memory banks is performed.

3. The memory device of claim 2, wherein when the delay detecting circuit receives a training operation completion signal indicating that the training operation has been completed, the delay detecting circuit outputs the delay control signals.

4. The memory device of claim 1, wherein the delay detecting circuit includes:
   a delay control signal generating circuit configured to receive the output control signals, and generate the delay control signals, based on the output control signals; and
   a delay control signal output circuit configured to receive a calibration enable signal, and output the delay control signals, based on the calibration enable signal.

5. The memory device of claim 4, wherein the delay detecting circuit is configured to compare a delay difference between output control signals corresponding to first merged data merged by the second merge circuit.

6. The memory device of claim 5, wherein the delay control signal indicates whether the delay difference between the output control signals is out of a predetermined range.

7. The memory device of claim 6, wherein the delay detecting circuit is configured to receive a first output control signal and a second output control signal among the output control signals, and configured to compare a signal obtained by delaying the first output control signal by the predetermined range with the second output control signal.

8. The memory device of claim 7, wherein the delay control signal output unit is configured to output the delay control signal to the compensating circuit in order to calibrate the first output control signal among the output control signals according to the comparison result.

9. The memory device of claim 1, wherein the output control signals are output from the memory banks, based on clock signals input to the memory banks.

10. The memory device of claim 9, wherein the compensating circuit is configured to delay an input signal, responsive to the delay control signals.

11. The memory device of claim 10, wherein the compensating circuit is configured to:
    receive the clock signals to be provided to the memory banks,
    delay the clock signals, responsive to the delay control signals, and
    provide the delayed clock signals to the memory banks.

12. A method of operating a memory device, the method comprising:
    generating delay control signals, based on output control signals output from at least a portion of a plurality of memory banks;
    calibrating the output control signals, based on the delay control signals;
    compressing data read from the plurality of memory banks;
    performing first merging on compressed data corresponding to different memory banks in a plurality of first merge circuits, based on the calibrated output control signals;
    performing second merging on first merged data on which the first merging is performed in a second merge circuit; and
    outputting second merged data on which the second merging is performed, based on the calibrated output control signals.

13. The method of claim 12, wherein the generating the delay control signals includes:
    comparing the output control signals, received by a delay detecting circuit; and
    providing a compensating circuit with delay control signals generated according to a result obtained by comparing the output control signals.

14. The method of claim 13, wherein, the comparing of the output control signals, comprises determining a delay difference between output control signals corresponding to first merged data on which the second merging is to be performed.

15. The method of claim 13, wherein providing the delay control signals to the first merge circuit, is performed responsive to the delay detecting circuit receiving a calibration enable signal.

16. The method of claim 15, wherein, in the comparing of the output control signals, the output control signals output from the memory banks are compared when a training operation in which dummy data is output from the memory banks is performed.

17. The method of claim 16, wherein the calibration enable signal is a training completion signal indicating that the training operation has been ended.

18. The method of claim 12, wherein calibrating the output control signals comprises:
- calibrating a clock signal, responsive to the delay control signals and providing the calibrated clock signal to the memory banks; and
- outputting calibrated output control signals from the memory banks, based on the calibrated clock signal.

* * * * *